(12) United States Patent
Retyunskiy et al.

(10) Patent No.: US 11,405,369 B1
(45) Date of Patent: Aug. 2, 2022

(54) DISTRIBUTED ENCRYPTED SESSION RESUMPTION

(71) Applicant: Amazon Technologies, Inc., Seattle, WA (US)

(72) Inventors: Evgeniy Retyunskiy, Bellevue, WA (US); Steven Collison, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 16/829,646

(22) Filed: Mar. 25, 2020

(51) Int. Cl.
*H04L 9/40* (2022.01)
*H04L 9/08* (2006.01)
*H04L 9/32* (2006.01)

(52) U.S. Cl.
CPC ........ *H04L 63/0428* (2013.01); *H04L 9/0861* (2013.01); *H04L 9/0894* (2013.01); *H04L 9/3236* (2013.01); *H04L 9/3263* (2013.01); *H04L 63/166* (2013.01)

(58) Field of Classification Search
None
See application file for complete search history.

(56) References Cited

U.S. PATENT DOCUMENTS

| 9,893,897 | B2 * | 2/2018 | Li | H04L 63/0227 |
| 2017/0126643 | A1 * | 5/2017 | Wood | H04L 63/0876 |
| 2018/0007059 | A1 * | 1/2018 | Innes | G06F 21/6218 |

* cited by examiner

*Primary Examiner* — Brandon Hoffman
(74) *Attorney, Agent, or Firm* — Klarquist Sparkman, LLP (57) ABSTRACT

Technologies are provided for generating an encrypted session resumption ticket and using the encrypted session resumption ticket to resume a secure session. As part of establishing a secure session with a client, a server can use a common key that is accessible by multiple servers and secret data (such as a private key, etc.) for a tenant associated with the secure session request to generate a session key. The session key can be used to encrypt a session resumption ticket. The client can transmit the encrypted session resumption ticket to another server to re-establish a secure session. The another server can retrieve the common key and the secret data for the tenant, and can use them to generate the session key. The another server can then decrypt the encrypted session resumption ticket using the session key and use the decrypted session resumption ticket to resume a secure session.

20 Claims, 6 Drawing Sheets

DISTRIBUTED ENCRYPTED SESSION RESUMPTION

BACKGROUND

At least some server computers can be configured to establish cryptographically secure communication sessions. For example, at least some web servers can be configured to secure TCP/IP communication sessions using transport layer security (TLS). A client and a web server can perform a secure exchange of a session key with which communication data transmitted between the client and server can be encrypted. In at least some scenarios, a web server can generate a TLS session resumption ticket that can be transmitted to a client and used by the client to resume a secure session.

DETAILED DESCRIPTION

At least some web servers can be configured to generate session resumption tickets (e.g., a TLS session resumption ticket). A session resumption ticket can be encrypted and provided to a client computer. The client computer can resume a secure session with the server at a later point in time by providing the encrypted session resumption ticket to the web server. The web server can decrypt the session resumption ticket and use the information contained in the session resumption ticket to re-establish the secure session with the client computer.

However, if a server maintains multiple server name identification (SNI) names and/or services multiple domains then, in at least some scenarios, using a same encryption key for all of them may impose a security risk. It is possible to address this problem in some cases by generating a unique encryption key for each session. However, in configurations with multiple servers, generating a unique encryption key for each session can prevent a secure session that is established on one server from being resumed on another server.

At least some of the technologies described herein can be used to address these problems. For example, multiple servers can be configured to store one or more common keys. As part of establishing a secure session for a tenant with a client computer, one of the servers can use one of the one or more common keys and secret data (such as a private key, etc.) for the tenant to generate a session key. The session key can then be used to encrypt a session resumption ticket that is transmitted to the client computer. The client computer can transmit the encrypted session resumption ticket to another server, of the multiple servers, to re-establish the secure session with the another server. The another server can retrieve the common key and the secret data for the tenant and can use them to generate the session key. The another server can then decrypt the encrypted session resumption ticket using the session key. Thus, in at least some cases, a secure session can be established with one server and then resumed with another server.

In at least some embodiments, the one or more common keys stored on the multiple servers can be changed periodically. For example, the one or more common keys can be replaced periodically with one or more other common keys after a specified time interval (such as a year, a month, a day, an hour, etc.). In at least some scenarios, changing the common keys periodically can improve security.

Figure 1:
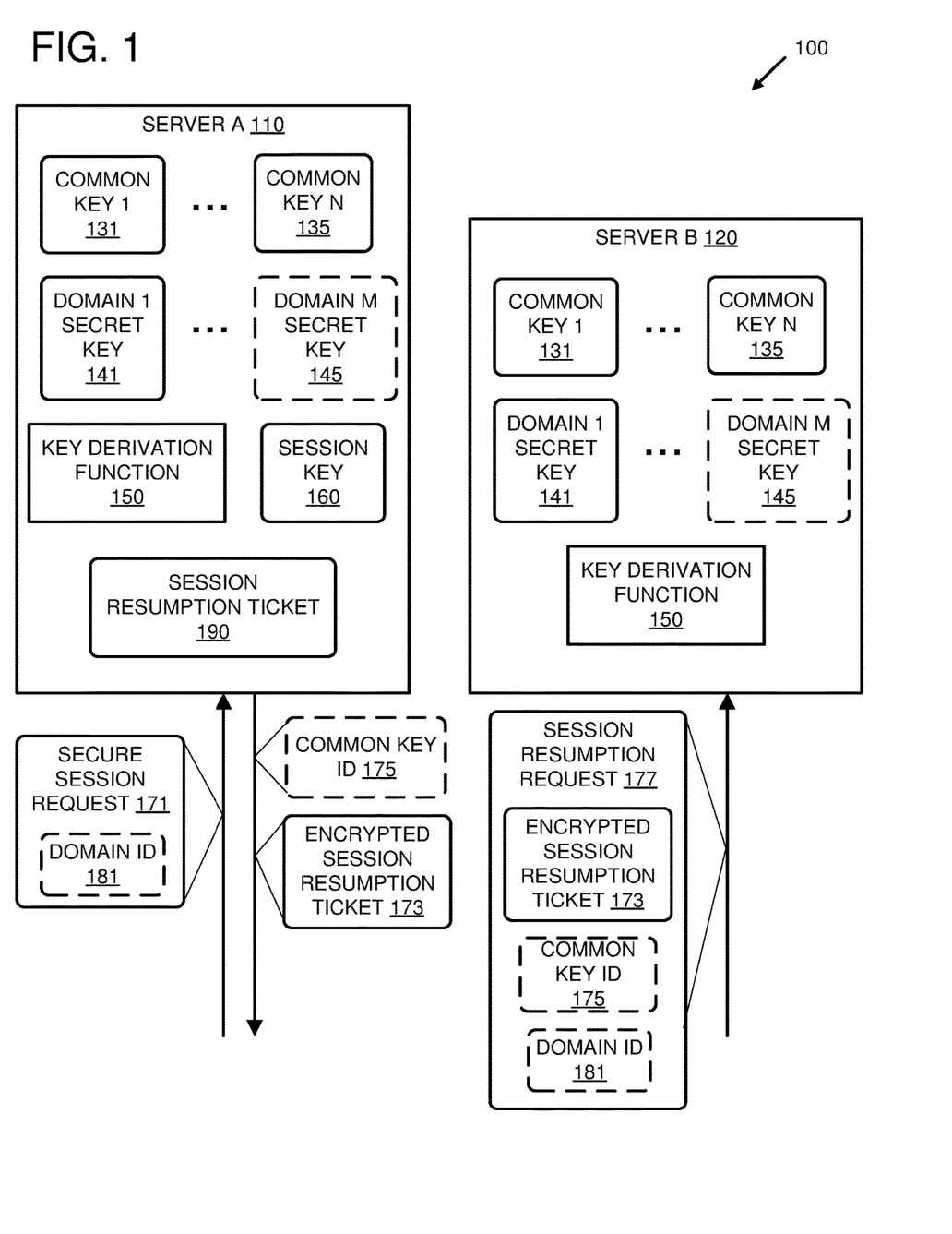
FIG. 1 is a system diagram depicting an example system for distributed encrypted session resumption.

FIG. 1 is a system diagram depicting an example system 100 for distributed encrypted session resumption. The example system 100 comprises a first server computer 110 and a second server computer 120. Although two server computers 110 and 120 are depicted in FIG. 1, other numbers of server computers are possible.

The first server 110 and second server 120 are configured to store a plurality of common keys 131-135. The common keys 131-135 can be keys that are shared by the first server 110 and the second server 120. In at least some embodiments, the common keys 131-135 can be rotated. For example, the common keys 131-135 can be replaced on the first server 110 and the second server 120 periodically (e.g., once a month, once a day, once an hour, etc.).

The first server 110 is configured to receive a request to establish a secure session 171. The request can be a request to establish a secure communication session, such as a transport layer security (TLS) session or the like. The server can be configured to receive the request from a client computer (not shown) via one or more wired and/or wireless communication channels. The request 171 can be a request to establish a secure session for a domain (such as a web domain or the like). For example, the secure session request 171 can comprise an identifier for a domain 181 (such as an identifier for a web domain). In such an embodiment, the domain can be a domain hosted by the first server 110. In at least some such embodiments, the second server 120 can be configured to host the domain as well.

The first server can be configured to retrieve a secret key 141 associated with the domain. In at least some embodiments, the first server 110 can be configured to store the domain secret key 141 in a computer-readable storage medium of the server 110. Optionally, the first server 10 can be configured to host a plurality of domains. In such an embodiment, the first server 110 can be configured to store secret keys 141-145 for the plurality of domains.

The first server can be configured to retrieve a common key (e.g., 131) of the plurality of common keys 131-135. Retrieving the common key (e.g., 131) can comprise selecting one of the common keys 131-135 at random. For example, the plurality of common keys 131-135 can be associated with identifiers (e.g., 175), such as numerical identifiers. In such an embodiment, an identifier can be selected at random and the common key associated with the identifier can be retrieved.

The first server 110 can be configured to generate a session key using a key derivation function 150, the common key 131, and the domain secret key 141. The session key 141 can be used to encrypt session data for the secure session. The common key 131 and the domain secret key 141 can be used as inputs for the key derivation function 150. The key derivation function 151 can comprise hardware and/or software components of the first server 110 that are configured to generate the session key 160 using the common key 131 and the secret key 141. In at least some embodiments, the key derivation function 150 can be a hash-based key derivation function (HKDF). In such an embodiment, generating the session key 160 can comprise generating a hash of the common key 131 and the domain secret key 141 and using the hash to generate the session key 160.

In at least some embodiments, the domain secret key 141 can comprise a private key associated with a digital certificate for the domain. In at least some such embodiments, generating the session key 160 can comprise generating a hash using the common key 131, the private key, and the digital certificate.

The first server 110 can be configured to encrypt the session resumption ticket 190 using the session key 160 and to transmit the encrypted session resumption ticket 190. In at least some embodiments, the first server 110 can be configured to transmit the identifier associated with the common key (e.g., 175) as well. For example, the first server 110 can be configured to transmit the encrypted session resumption ticket 173 and the common key identifier 175 to a client computer (not shown) from which the secure session request 171 was received.

The second server 120 can be configured to receive a request 177 to resume the secure session for the domain. The session resumption request 177 can be received from the client computer which transmitted the secure session request 171. The session resumption request 177 can comprise the encrypted session resumption ticket 173. The second server 120 can be configured to decrypt the encrypted session resumption ticket 173 without interaction with the first server 110.

The second server 120 can be configured to retrieve the common key 131 from the plurality of common keys 131-135. For example, in embodiments where the first server 110 transmits the common key identifier 175 to the client computer, the session resumption request 177 can comprise the common key identifier 175. The second server 120 can be configured to use the common key identifier 175 to select the common key 131 from the plurality of common keys 131-135.

The second server 120 can be configured to retrieve the secret key 141 for the domain. In an embodiment where the second server 120 hosts multiple domains, the second server 120 can be configured to store the plurality of domain secret keys 141-145. In such an embodiment, the second server 120 can be configured to retrieve the domain secret key 141 using the domain identifier 181. For example, the domain identifier 181 can be included in the session resumption request 177. Alternatively, the domain identifier can be transmitted to the second server 120 separately.

The second server 120 can be configured to generate the session key 160 using the key derivation function 150, the common key 131, and the domain secret key 141 and to use the session key 160 to decrypt the encrypted session resumption ticket 173. The second server 120 can then use the decrypted session resumption ticket to enable resumption of the secure session with the client computer. Thus, in at least some scenarios, the common key 131, domain secret key 141, and key derivation function 150 can be used to enable the establishment of a secure session on one server and the resumption of that secure session on another server.

In any of the examples described herein, a computing device can be a server or other computing device that comprises a processor and is connected to a communication interface. The computing device can be configured to communicate with one or more other computing devices using the communication interface. The computing device can be configured to communicate with one or more other computing devices via one or more communication media. The communication media can comprise direct connections, such as a cable or bus connections, indirect connections, such as connections over a network, or some combination thereof.

In any of the examples described herein, a key (such as a session key, common key, domain secret key, etc.) can be a cryptographic key that can be used to encrypt and/or decrypt data using an encryption algorithm and/or decryption algorithm. Example keys include symmetric encryption keys and asymmetric encryption keys (such as private and public key pairs). A computing device can be configured to store a key in a computer-readable storage medium and/or a memory of the computing device. In at least some embodiments, a cryptographic key can be associated with a digital certificate.

Figure 2:
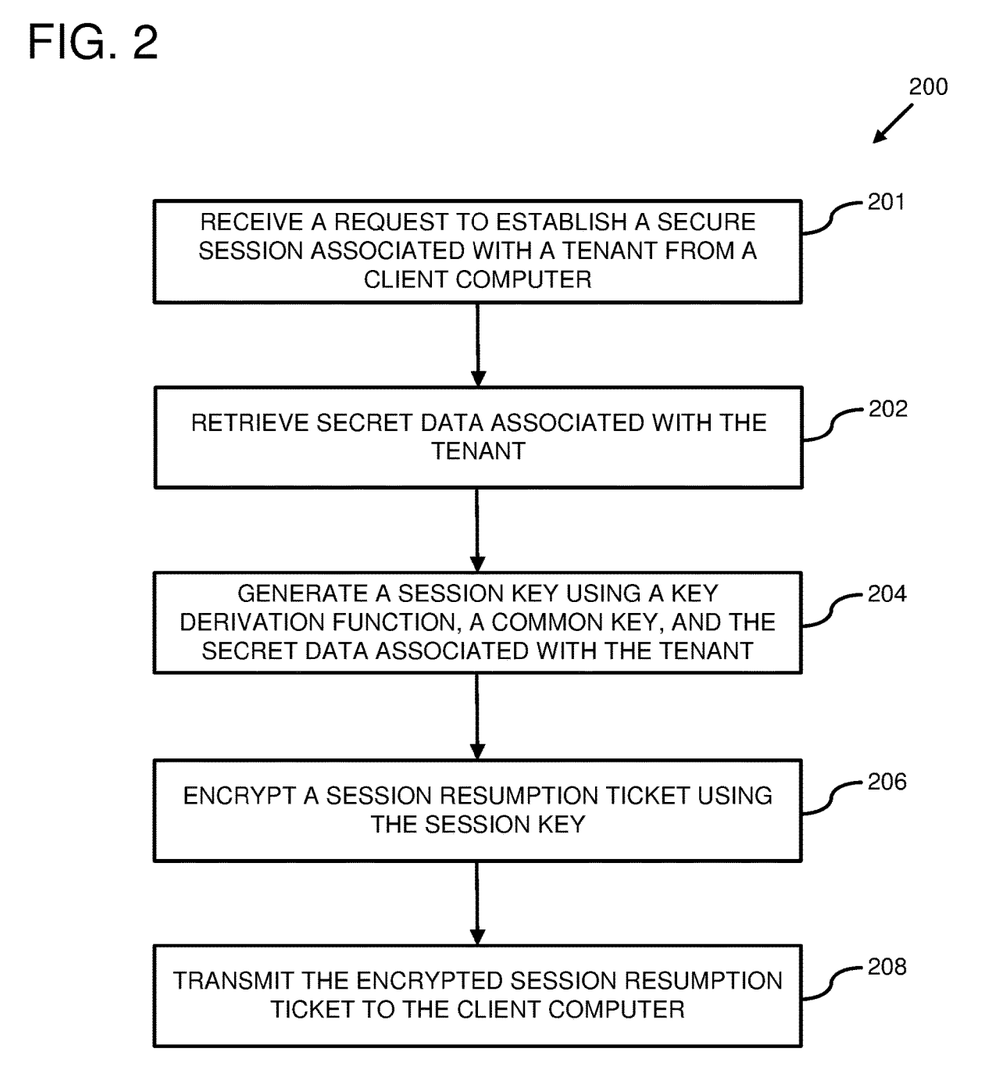
FIG. 2 is flowchart of an example method for generating an encrypted session resumption ticket.

FIG. 2 is a flowchart of an example method 200 for generating an encrypted session resumption ticket. Any of the example systems described herein can be used to perform the example method 200. For example, the example system 300 depicted in FIG. 3 can be used to perform all or part of the example method 200.

Figure 3:
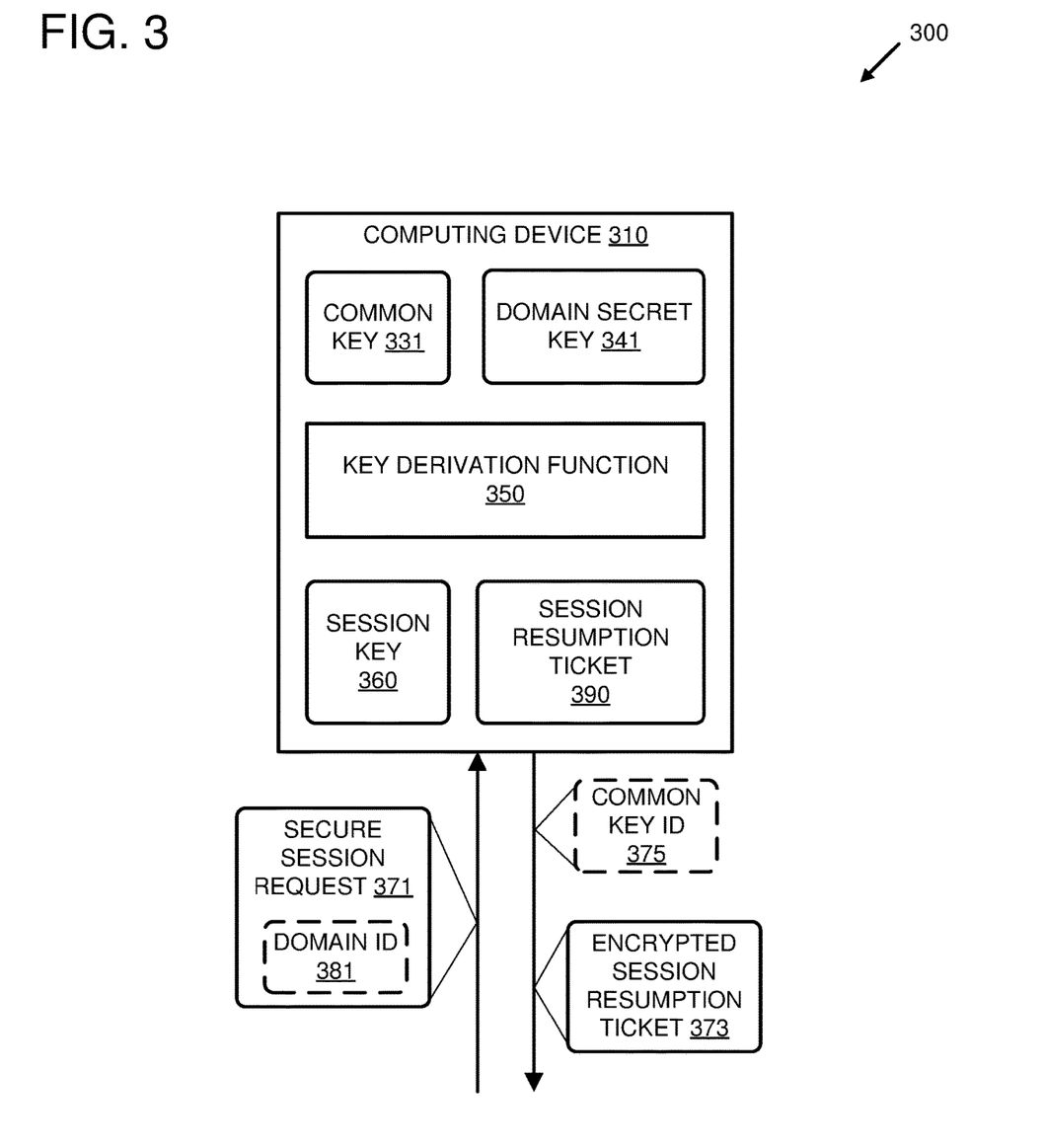
FIG. 3 is a system diagram depicting an example system comprising a computing device configured to generate an encrypted session resumption ticket.

FIG. 3 is a system diagram depicting an example system 300 comprising a computing device 310 configured to generate an encrypted session resumption ticket 373. The computing device 310 can comprise a processor (not shown) and a memory (not shown) storing instructions that, when executed by the processor, cause the computing device 310 to perform operations for generating an encrypted session resumption ticket.

Referring to FIG. 2, at 201, a request to establish a secure session associated with a tenant is received from a client computer. The client computer can be a computer of a user associated with the tenant. In at least some embodiments, the request can comprise a request to establish a transport layer security (TLS) session. The tenant can be an entity whose application (such as a website, web service, etc.) is hosted on a computing device at which the request is received. In at least some embodiments the tenant can be associated with a domain through which the application of the tenant is accessed. For example the computing device 310 can receive a request 371 to establish a secure session for a domain. In at least some embodiments, the secure session request 371 can comprise an identifier 381 for the domain associated with the tenant.

At 202, secret data associated with the tenant is retrieved. The secret data can comprise one or more data items associated with the tenant that is/are used to secure information associated with the tenant. In at least some embodiments, the secret data can comprise a cryptographic key associated with the tenant. For example, the computing device 310 can retrieve a secret key 341 associated with the domain. Additionally or alternatively, the secret data can comprise a digital certificate associated with the tenant. The secret data associated with the tenant can be stored on a computing device that receives the request to establish the secure session. For example, the computing device 310 can retrieve the domain secret key 341 from a computer-readable medium or memory of the computing device 310. In at least some embodiments, the secret key 341 comprises a private key of a digital certificate associated with the domain.

At 204, a session key is generated using a key derivation function, a common key, and the secret data associated with the tenant. The common key can be a key that is shared by multiple computing devices configured to receive secure session requests. In at least some embodiments, the common key can be stored in a storage location that is accessible by multiple computing devices. Additionally or alternatively, the common key can be stored in storage devices of the multiple computing devices. For example, the computing device 310 can retrieve the common key 331. The common key 331 can be stored on the computing device 310 and one or more other computing devices (not shown).

In at least some embodiments, the common key can be selected from a plurality of common keys.

The common key and secret data associated with the tenant can be used with a key derivation function to generate the session key. The common key and secret data can be combined to create an input for the key derivation function. For example, the computing device 310 can use a key derivation function 350, the domain secret key, and the common key to generate a session key 360.

The key derivation function can be a hash-based key derivation function (HKDF). In such an embodiment, the common key and the tenant secret data can be used to generate a hash that is used as an input for the key derivation function. For example, the computing device 310 can generate a hash using the common key 331 and the domain secret key 341 and use the hash as an input for the key derivation function 350. In at least some cases, generating a hash can improve the efficiency of the operation of the key derivation function. For example, in an embodiment where the tenant secret data comprises a large amount of data, generating a hash of the tenant secret data and the common key can result in an input for the key derivation function that is smaller in size than the tenant secret data.

In at least some embodiments, the hash for the tenant can be stored and used for processing subsequent requests. For example, another request to establish another session associated with the tenant can be received from another client computer. The hash for the tenant can be retrieved and the hash can be used to generate another encrypted session resumption ticket for the another client computer.

At 206, a session resumption ticket is encrypted using the session key. For example, the computing device 310 can use the session key 360 to encrypt a session resumption ticket 390.

At 208, the encrypted session resumption ticket is transmitted to the client computer. For example, the encrypted session resumption ticket 373 can be transmitted by the computing device 310 to a client computer. In an embodiment where the common key is selected from a plurality of common keys, an identifier associated with the common key can be transmitted to the client computer with the encrypted session resumption ticket. For example, the computing device can transmit an identifier 375 associated with the common key 331.

The encrypted session resumption ticket can be stored by a client computer and transmitted to a computing device to resume the secure session at a later date if it has expired. The computing device that receives the encrypted session resumption ticket can be the computing device that generated the encrypted session resumption ticket or another computing device.

A session resumption request can be received from the client computer, wherein the session resumption request comprises the encrypted session resumption ticket. The secret data associated with the tenant can be retrieved and the session key can be regenerated using the key derivation function, the common key, and the secret data associated with the tenant. The encrypted session resumption ticket can then be decrypted using the session key.

For example, the computing device 310 can receive a request to resume the secure session for the domain (not shown), the request comprising the encrypted session resumption ticket 373. The computing device 310 can retrieve the secret key 341 associated with the domain and regenerate the session key 360 using the key derivation function 350, the secret key 341, and the common key 331. The computing device 310 can then decrypt the encrypted session resumption ticket 373 using the session key 360.

Figure 4:
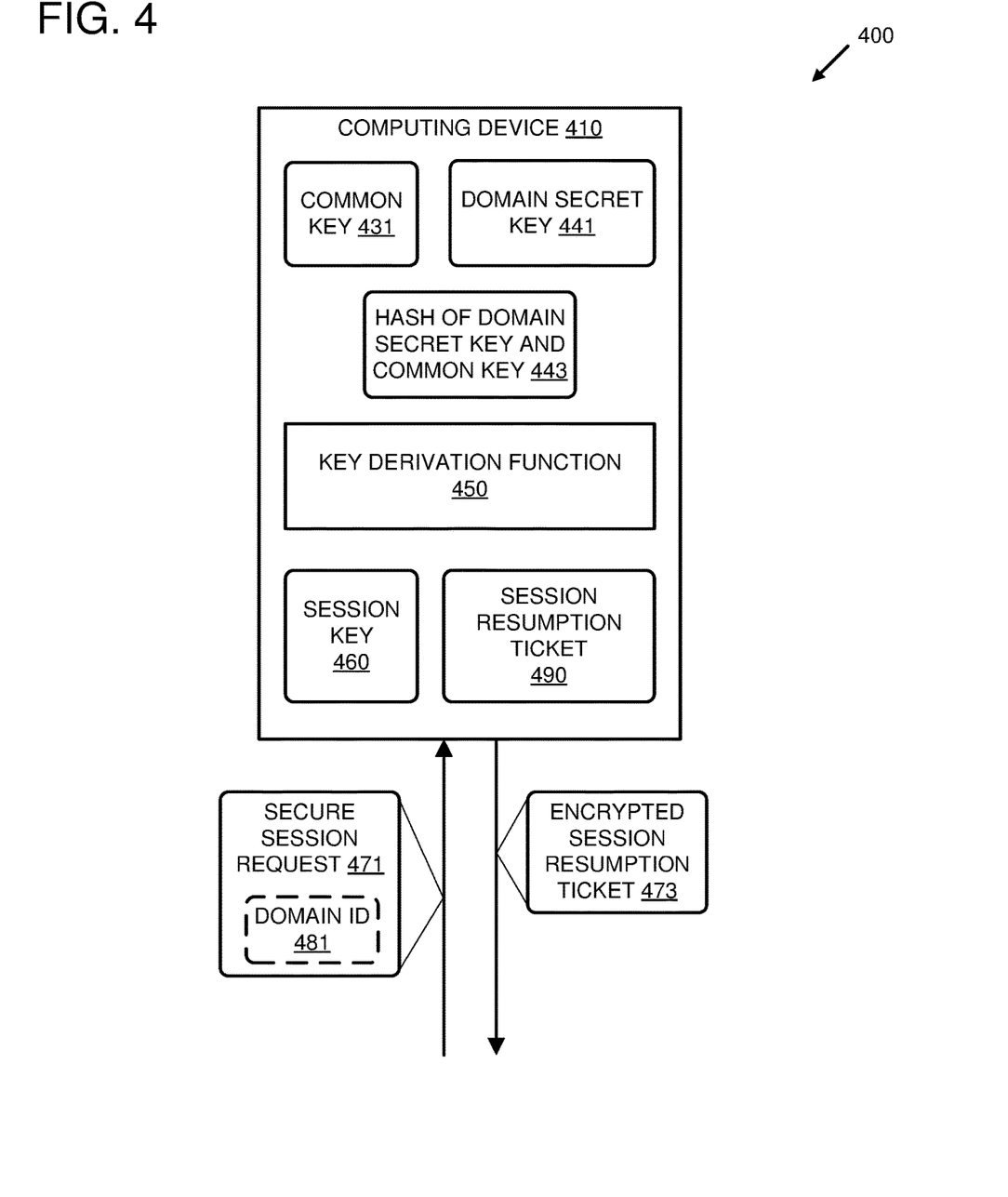
FIG. 4 is a system diagram depicting an example system comprising a computing device configured to cache a hash of a common key and a domain secret key.

FIG. 4 is a system diagram depicting an example system 400 comprising a computing device 410 configured to cache a hash 443 of a common key 431 and a domain secret key 441.

The computing device 410 comprises a common key 431 and a secret key 441 associated with a domain. The computing device 410 can be configured to generate a hash 443 of the domain secret key 441 and the common key 431. The computing device 410 can be configured to store the hash 443. In at least some embodiments, the computing device 410 can be configured to store secret keys for a plurality of domains (not shown). In such an embodiment, the computing device 410 can be configured to generate and store a plurality of hashes generated using the common key 431 and the plurality of domain secret keys. For example, the computing device 410 can generate the hash 443 using the common key 431 and the domain secret key 441 and can generate another hash using the common key 431 and another domain secret key.

The computing device 410 can be configured to receive a request 471 to establish a secure session. The computing device 410 can be configured to generate a session key 460 using a key derivation function 450 and the hash 443 and transmit the encrypted session resumption ticket 473. The computing device 410 can then encrypt a session resumption ticket 490 using the session key 460. In an embodiment where the computing device 410 stores a plurality of secret keys for a plurality of domains, the secure session request 471 can comprise an identifier 481 for a domain associated with the secret key 441. The computing device 410 can use the domain identifier 481 to identify a hash of the common key 431 and a secret key for the domain associated with the domain identifier 481.

In at least some embodiments, the computing device 410 can be configured to pre-generate and cache the hash 443 prior to reception of the secure session request 471. Additionally or alternatively, the computing device 410 can be configured to generate the hash 443 subsequent to receiving the secure session request 471.

In at least some embodiments, the hash 443 can be generated subsequent to receiving one session establishment request and to cache the hash 443 for use in processing subsequent requests. For example, the computing device 410 can generate the hash 443 and use the hash 443 to generate the session key as part of processing the request 471. The computing device 410 can receive another request to establish another secure session for the domain (not shown). The computing device 410 can then use the hash 443 to generate the session key 460 and use the session key 460 to encrypt another session resumption ticket (not shown). In at least some embodiments, the hash 443 can be stored in a memory of the computing device 410 and, subsequent to receiving the another request, can retrieve the hash 443 from the memory.

Figure 5:
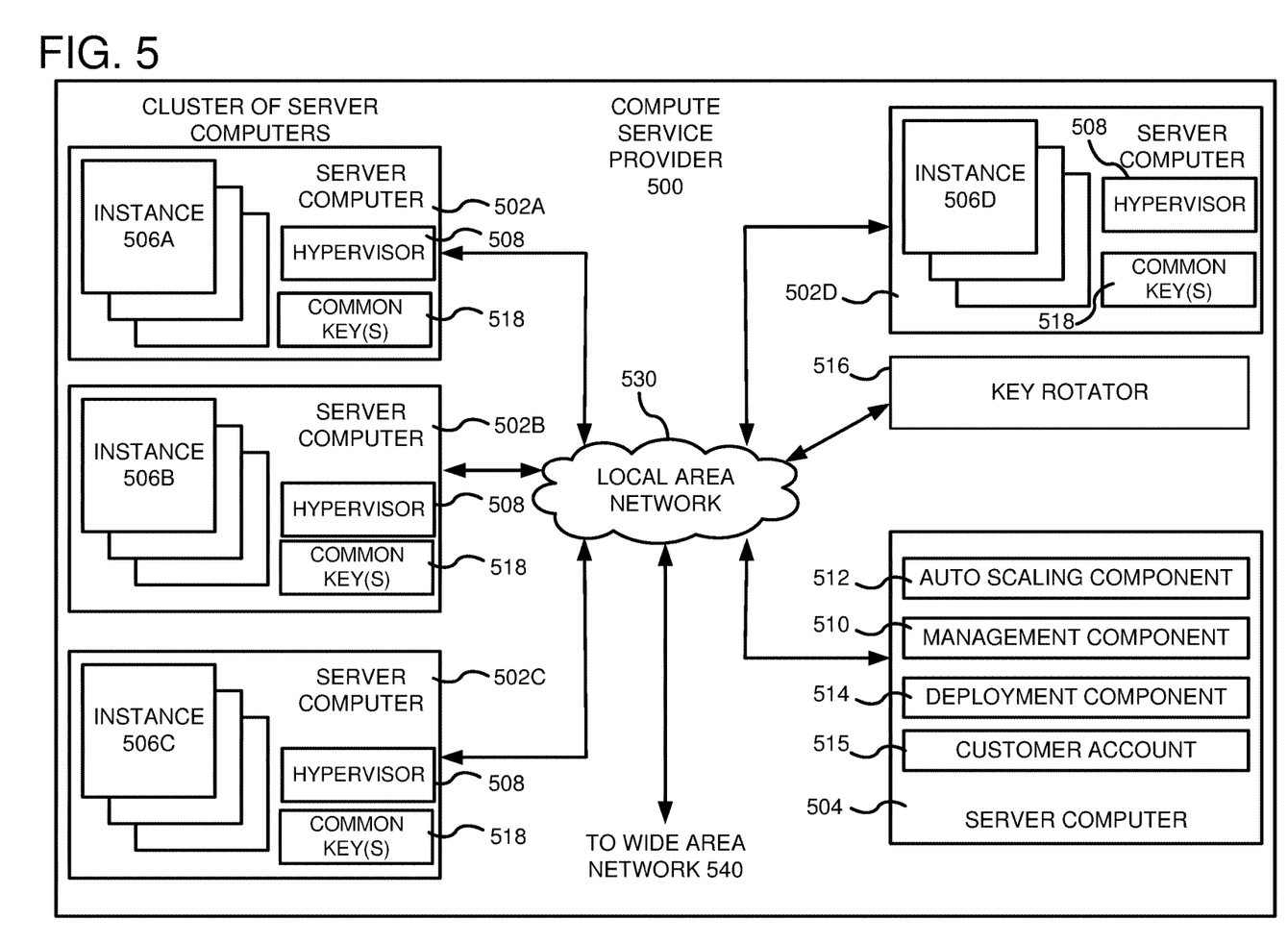
FIG. 5 is an example system diagram depicting a plurality of virtual machine instances running in a multi-tenant environment.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example, each of the servers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine slots, with each virtual machine slot capable of running a virtual machine instance (e.g., server computer 502A could be configured to support three virtual machine slots each running a corresponding virtual machine instance). Additionally, each of the instances 506 can be configured to execute one or more applications.

It should be appreciated that, although the embodiments disclosed herein with respect to compute service provider 500 are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can comprise Clos networks or other types of multi-tiered network fabrics. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and network devices can be utilized to interconnect the various computing systems disclosed herein.

The server computers 502 can be configured to perform secure session operations as described herein. For example, a plurality of common keys 518 can be stored on the server computers 502. The server computers 502 can be configured to encrypt and decrypt session resumption tickets. For example, the server computer 502A can receive a request to establish a secure session via the local area network 530. The secure session can be a secure session for interacting with an application hosted by the instance 506A. The server computer 502A can retrieve one of the plurality of common keys and a secret key for a tenant associated with the instance 506A. For example, the secret key can comprise a private key for a digital certificate associated with the tenant (and/or a domain associated with the tenant). The server computer 502A can use the secret key for the tenant and the common key to generate a session key. The server computer 502A can use the session key to encrypt a session resumption ticket for the secure session. The server computer can transmit the encrypted session resumption ticket via the local area network 530.

For example, the server computer 502A can establish the secure session with a client computer connected to the wide area network 540. The client computer can transmit the encrypted session resumption ticket as part of a request to resume the secure session. The request to resume the secure session can be received by another of the server computers 502. For example, the server computer 506B can receive the request to resume the secure session. The server computer 506B can retrieve the common key from the plurality of common keys 518 (for example, the request to resume the session can comprise an identifier for the common key that was transmitted along with the encrypted session resumption ticket by the server computer 502A). The server computer 506B can retrieve the secret key for the tenant and can generate the session key using the common key and the secret key for the tenant. The server computer 502B can then decrypt the encrypted session resumption key using the session key. In at least some embodiments, the server computer 502B can reestablish the secure session using the instance 506B. Although the server computers 502 are depicted as comprising hypervisors 508, in at least some embodiments, one or more of the server computers 502 can be configured to operate without a hypervisor 508. For example, one or more of the server computers 502 can be configured to execute one or more applications outside of the instances 506.

In at least some embodiments, the compute service provider 500 can comprise a key rotator service 516. The key rotator service 516 can be configured to periodically rotate the common keys 518 stored on the server computers 502. The key rotator service 526 can be hosted by a server computer. In at least one embodiment, the key rotator can be hosted by one of the server computers 502. The key rotator 516 can replace the common keys 518 with different common keys on a periodic basis (such as once per month, once per day, once per hour, etc.). The key rotator service 516 can be transmitted to the server computers 502 via one or more communication channels. In at least some embodiments, the one or more channels can be secure communication channels. Although the key rotator service 516 is depicted as being connected to the local area network 530, the key rotator service 516 can be configured to transmit the common keys over the Internet.

Figure 6:
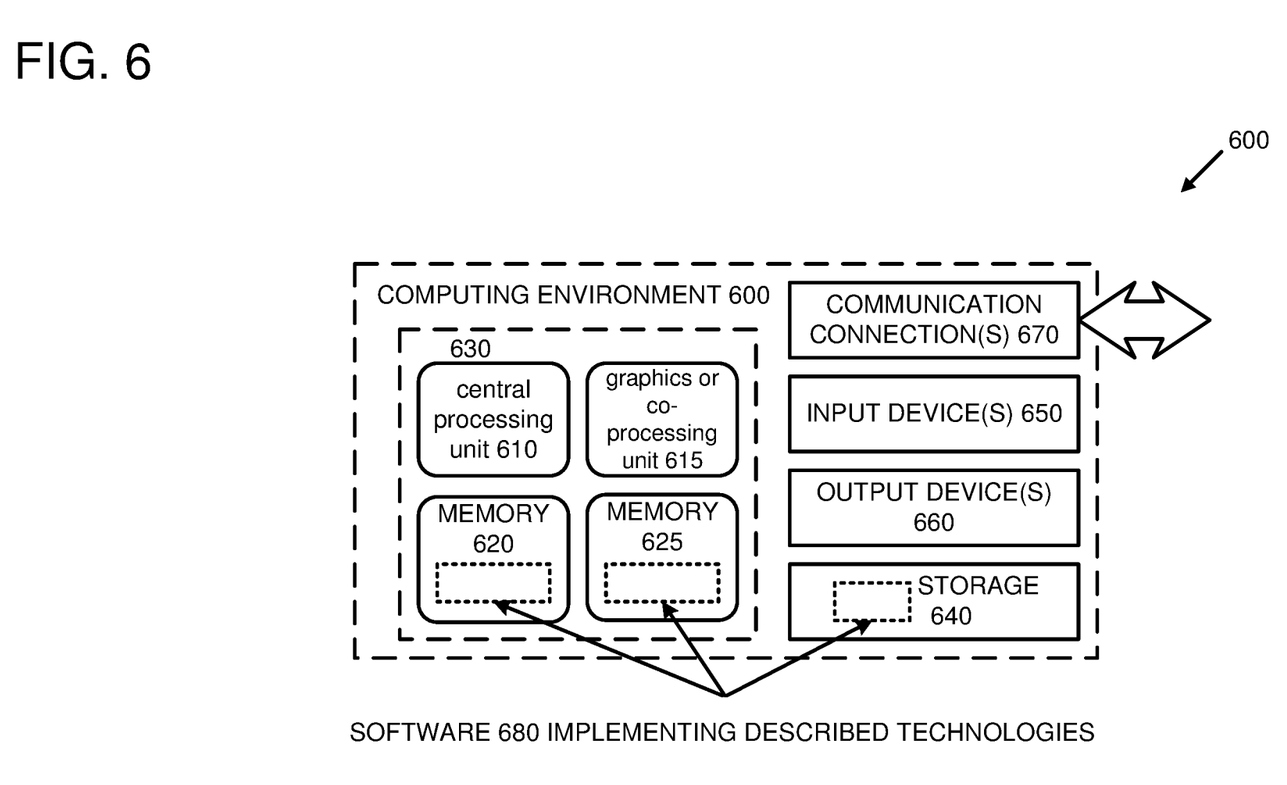
FIG. 6 is a diagram depicting a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 can store software 680 implementing one or more innovations described herein, (for example, in the form of computer-executable instructions suitable for execution by the processing unit(s)).

In at least some embodiments, the computing environment 600 can comprise a computing device or server computer as described herein.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 can store instructions for the software 680 implementing one or more innovations described herein (for example in a storage medium and/or firmware of the storage 640).

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for distributed encrypted session resumption, comprising:
    a first server computer configured to:
        store a plurality of common keys,
        receive a request to establish a secure session for a web domain from a client computer,
        retrieve a secret key associated with the web domain and a common key, of the plurality of common keys,
        generate a session key using a key derivation function, the secret key associated with the web domain, and the common key,
        encrypt a session resumption ticket using the session key, and
        transmit the encrypted session resumption ticket and an identifier associated with the common key to the client computer; and
    a second server configured to:
        store the plurality of common keys,
        receive a request to resume the secure session for the web domain from the client computer, the request comprising the encrypted session resumption ticket and the identifier associated with the common key,
        retrieve the common key, from the plurality of common keys, using the identifier,
        retrieve the secret key associated with the web domain,
        generate the session key using the key derivation function, the secret key associated with the web domain, and the common key, and
        use the session key to decrypt the encrypted session resumption ticket, wherein the session resumption ticket is used to resume the secure session for the web domain with the client computer at the second server.

2. The system of claim 1, wherein the secure session is a transport layer security session.

3. The system of claim 1, wherein the key derivation function is a hash-based key derivation function.

4. The system of claim 3, wherein:
    the secret key associated with the web domain comprises a private key associated with a digital certificate for the web domain; and
    generating the session key comprises generating a hash using the common key, the private key, and the digital certificate.

5. The system of claim 4, wherein the first server computer is further configured to:
    receive another request to establish another secure session for the web domain;
    use the hash to generate the session key; and
    use the session key to encrypt another session resumption ticket.

6. A method, comprising:
    receiving, at a first server, a request to establish a secure session for a web domain associated with a tenant from a client computer;
    retrieving, at the first server, secret data associated with the tenant;
    generating, at the first server, a session key using a key derivation function, a common key, and the secret data associated with the tenant;
    encrypting, at the first server, a session resumption ticket using the session key; and
    transmitting, by the first server, the encrypted session resumption ticket to the client computer, wherein the encrypted session resumption ticket is used to resume the secure session for the web domain with the client computer at a second server.

7. The method of claim 6, further comprising:
    receiving, at the second server, a session resumption request from the client computer, wherein the session resumption request comprises the encrypted session resumption ticket;
    retrieving, at the second server, the secret data associated with the tenant;
    regenerating, at the second server, the session key using the key derivation function, the common key, and the secret data associated with the tenant; and
    decrypting, at the second server, the encrypted session resumption key using the session key.

8. The method of claim 6, wherein the generating the session key comprises:
    generating a hash for the tenant using the secret data associated with the tenant and the common key; and
    using the hash to generate the session key.

9. The method of claim 8, further comprising:
storing, at the first server, the hash for the tenant;
receiving, at the first server, another request to establish another session associated with the tenant from another client computer;
retrieving, at the first server, the hash for the tenant; and
using, at the first server, the hash to generate another encrypted session resumption ticket for the another session.

10. The method of claim 6, wherein the secret data comprises a digital certificate associated with the tenant.

11. The method of claim 6, further comprising:
selecting, at the first server, the common key from a plurality of common keys; and
transmitting, by the first server, an identifier associated with the common key to the client computer with the encrypted session resumption ticket.

12. The method of claim 6, wherein the key derivation function is a hash-based key derivation function.

13. The method of claim 6, wherein the request comprises a request to establish a transport layer security session.

14. A computing device comprising a processor and a memory storing instructions that, when executed by the processor, cause the computing device to perform operations, the operations comprising:
receiving a request to establish a secure session for a web domain;
retrieve a secret key associated with the web domain;
generate a session key using a key derivation function, the secret key associated with the web domain, and a common key;
encrypt a session resumption ticket using the session key; and
transmit the encrypted session resumption ticket, wherein the encrypted session resumption ticket is used to resume the secure session for the web domain at a second computing device.

15. The computing device of claim 14, wherein the operations further comprise:
receiving a request to resume the secure session for the web domain, the request comprising the encrypted session resumption ticket;
retrieving the secret key associated with the web domain;
regenerating the session key using the key derivation function, the secret key associated with the web domain, and the common key; and
decrypting the encrypted session resumption ticket using the session key.

16. The computing device of claim 14, wherein the generating the session key comprises:
generating a hash using the common key and the secret key associated with the web domain; and
using the hash to generate the session key.

17. The computing device of claim 16, wherein the operations further comprise:
storing the hash in the memory of the computing device;
receiving another request to establish another secure session for the web domain;
retrieving the hash from the memory;
using the hash to generate the session key; and
using the session key to encrypt another session resumption ticket.

18. The computing device of claim 14, wherein:
the memory stores a plurality of common keys, including the common key; and
the operations further comprise:
selecting the common key from the plurality of common keys; and
transmitting an identifier associated with the common key with the encrypted session resumption ticket.

19. The computing device of claim 14, wherein the secret key comprises a private key of a digital certificate associated with the web domain.

20. The computing device of claim 14, wherein the key derivation function is a hash-based key derivation function.

* * * * *